(12) United States Patent
Couasnon et al.

(10) Patent No.: US 9,561,740 B2
(45) Date of Patent: Feb. 7, 2017

(54) SLIDING TRACKS FOR VEHICLE SEATS, VEHICLE SEAT COMPRISING SUCH A TRACK

(71) Applicant: Faurecia Sièges d'Automobile, Nanterre (FR)

(72) Inventors: Christian Couasnon, Flers (FR); Sylvain Deschamps, St. Georges des Groseillers (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 14/852,314

(22) Filed: Sep. 11, 2015

(65) Prior Publication Data

US 2016/0075259 A1    Mar. 17, 2016

(30) Foreign Application Priority Data

Sep. 12, 2014  (FR) ..................... 14 58587

(51) Int. Cl.
| | |
|---|---|
| *F16M 13/00* | (2006.01) |
| *B60N 2/06* | (2006.01) |
| *B60N 2/07* | (2006.01) |
| *B60N 2/075* | (2006.01) |
| *B60N 2/68* | (2006.01) |
| *B60N 2/015* | (2006.01) |

(52) U.S. Cl.
CPC .............. *B60N 2/067* (2013.01); *B60N 2/015* (2013.01); *B60N 2/072* (2013.01); *B60N 2/075* (2013.01); *B60N 2/0705* (2013.01); *B60N 2/0715* (2013.01); *B60N 2/0722* (2013.01); *B60N 2/682* (2013.01)

(58) Field of Classification Search
CPC ....... B60N 2/067; B60N 2/072; B60N 2/0722; B60N 2/0715
USPC ......... 248/424, 429; 296/65.13, 65.14, 65.15
See application file for complete search history.

(56) References Cited

U.S. PATENT DOCUMENTS

| | | | |
|---|---|---|---|
| 6,220,642 B1* | 4/2001 | Ito ........................ | B60N 2/0232 248/429 |
| 2010/0133408 A1* | 6/2010 | Umezaki ................ | B60N 2/067 248/429 |

(Continued)

FOREIGN PATENT DOCUMENTS

| | | |
|---|---|---|
| DE | 19544376 A1 | 7/1997 |
| FR | 2798098 A1 | 3/2001 |

(Continued)

OTHER PUBLICATIONS

Written opinion corresponding to Application No. FR1458587, dated Sep. 12, 2014 (in French, no English translation available).

(Continued)

*Primary Examiner* — Todd M Epps
(74) *Attorney, Agent, or Firm* — Reising Ethington P.C.

(57) ABSTRACT

A sliding track for a vehicle seat. The sliding track includes a first rail secured to a motor vehicle frame, a second rail mounted so as to slide relative to the first rail, and a drive mechanism adapted to move the second rail relative to the first rail. The first rail has a base and two lateral flanges, and the drive mechanism includes a threaded rod. The sliding rail includes a front support mounted on a lateral flange of the first rail, to which the front end of the threaded rod is fixed.

12 Claims, 5 Drawing Sheets

(56) References Cited

U.S. PATENT DOCUMENTS

| 2011/0079699 | A1* | 4/2011 | Tarusawa | B60N 2/067 |
| | | | | 248/430 |
| 2011/0278875 | A1* | 11/2011 | Couasnon | B60N 2/067 |
| | | | | 296/65.13 |
| 2014/0374560 | A1 | 12/2014 | Speck et al. | |

FOREIGN PATENT DOCUMENTS

| JP | H1128954 A | 2/1999 |
| JP | 2006069251 A | 3/2006 |
| WO | 2012008661 A1 | 1/2012 |
| WO | 2012093002 A1 | 7/2012 |

OTHER PUBLICATIONS

Search Report corresponding to Application No. FR1458587, dated May 27, 2015 (in French, no English translation available).

\* cited by examiner

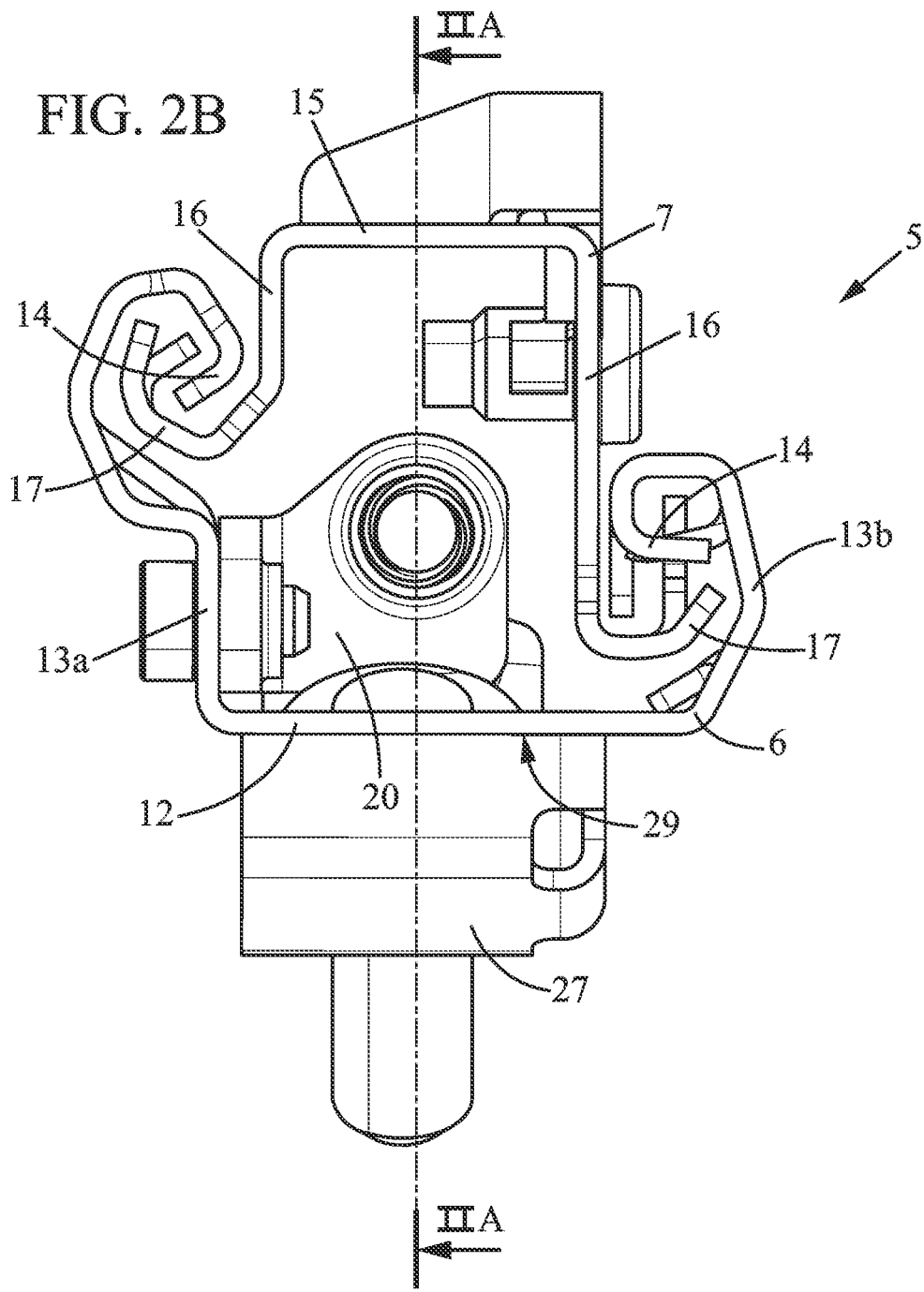

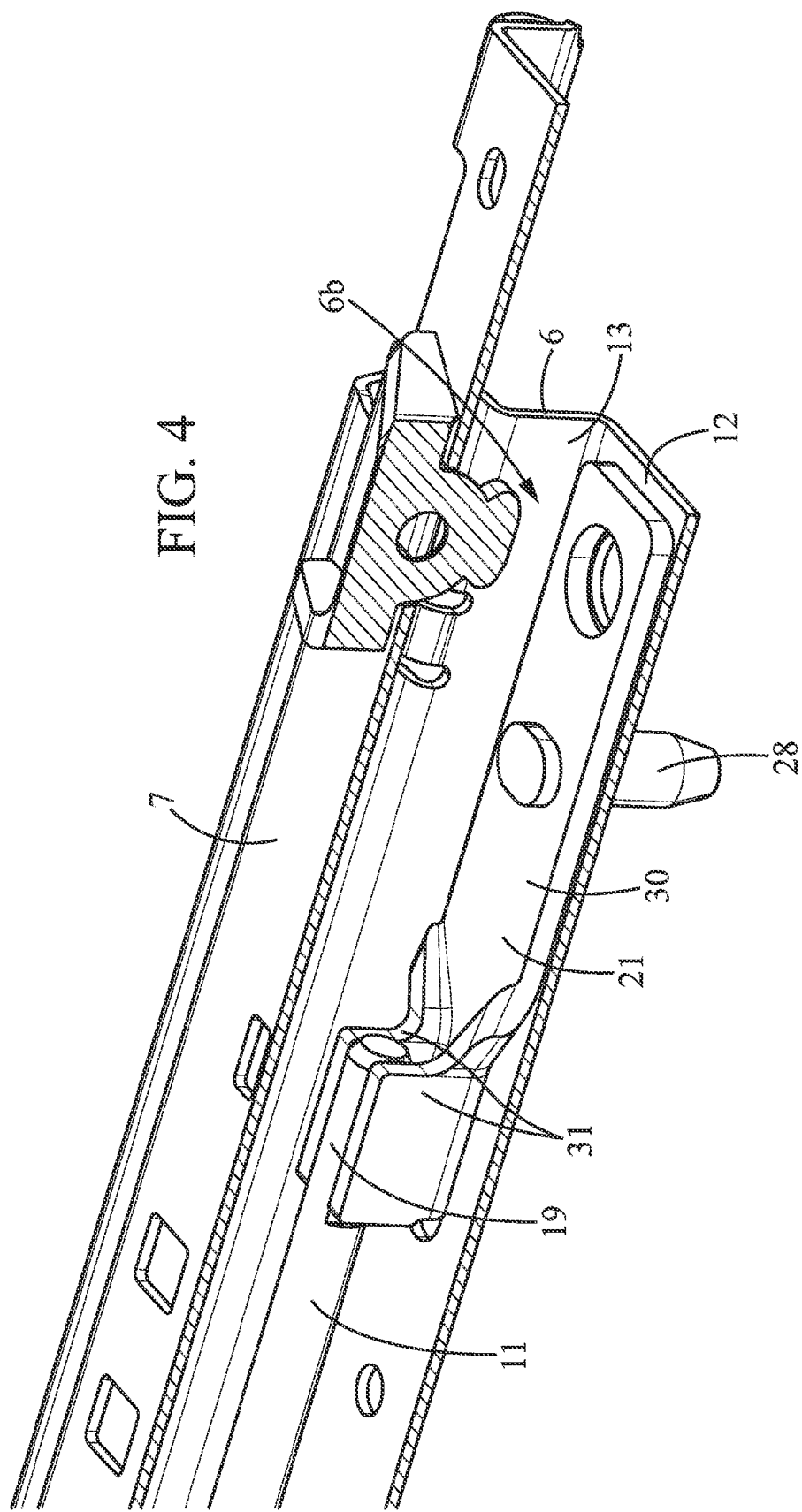

SLIDING TRACKS FOR VEHICLE SEATS, VEHICLE SEAT COMPRISING SUCH A TRACK

FIELD OF THE INVENTION

The present invention relates to sliding tracks for vehicle seats and to vehicle seats comprising such sliding tracks.

More particularly, the invention relates to a sliding track for a vehicle seat, comprising a first rail adapted to be secured to a motor vehicle frame, the first rail extending in a longitudinal direction and comprising a base extending along a horizontal plane, and two lateral flanges arranged one on either side of the base relative to a transverse direction in the horizontal plane perpendicular to the longitudinal direction, a second rail mounted so as to slide relative to the first rail in the longitudinal direction, a drive mechanism adapted to move the second rail relative to the first rail in the longitudinal direction, wherein the drive mechanism comprises a threaded rod extending in the longitudinal direction between a front end and a back end, the sliding track comprising a front support integral with the first rail and to which the front end of the threaded rod is attached.

BACKGROUND OF THE INVENTION

Document WO-A-99/51456 discloses an example of such a rail.

However, there is a need to allow users to move the seat over a greater distance of travel relative to the vehicle frame, in order to increase the range of possible seat adjustments and thus the user comfort.

The present invention is intended to improve the situation.

OBJECTS AND SUMMARY OF THE INVENTION

To this end, according to an aspect of the invention, a sliding track of the type specified above is characterized in that the front support extends from at least one lateral flange of the first rail.

With these arrangements, the front attachment of the threaded rod can be positioned at the front of the first rail and can thus increase the distance the second rail can travel relative to the first rail. This increases the distance the seat can travel longitudinally relative to the vehicle floor. In addition, this avoids the presence of protruding portions on the underside of the rail attached to the vehicle frame, which facilitates integration of the seat with the motor vehicle.

In preferred embodiments of the invention, one or more of the following arrangements may possibly also be used:

the front support is mounted on, or integrated into, said at least one lateral flange;

the front support has a substantially planar first portion, a substantially planar second portion, and a bend connecting the first portion to the second portion such that the first portion is substantially perpendicular to the second portion;

the first portion of the front support is integral with a lateral flange of the first rail and the front end of the threaded rod is fixed to the second portion of the front support;

the first portion of the front support is secured to said lateral flange of the first rail in at least two securing locations spaced apart from each other along the longitudinal direction, in particular by means of at least two securing elements respectively arranged at said securing locations;

the sliding track further comprises a rear support integral with the base of the first rail and receiving the back end of the threaded rod;

the front end of the threaded rod is screwed to the front support, and the back end of the threaded rod is secured in a fixed manner to the rear support, in particular by compression between two flanges of said rear support;

the sliding track further comprises a front fastening means for attaching the first rail to a motor vehicle frame, mounted on the base of the first rail, and the front support is mounted on a lateral flange of the first rail, such that it is arranged substantially facing the front fastening means, in the transverse direction;

the sliding track is adapted to be in contact with the motor vehicle frame at a bottom face of the base of the first rail, between a front fastening means for attaching the first rail to a motor vehicle frame and a rear fastening means for attaching the first rail to a motor vehicle frame, and the sliding track has no parts protruding below said bottom face, between said front fastening means and said rear fastening means;

the front support extends from an inner surface of the first rail;

the threaded rod is received within an inner space inside the sliding track, delimited by the first rail and second rail.

The invention also relates to a vehicle seat comprising a seating portion supported by at least one sliding track as described above.

Other features and advantages of the invention will be apparent from the following description of one of its embodiments, given by way of non-limiting example with reference to the accompanying drawings.

BRIEF DESCRIPTION OF THE DRAWINGS

In the drawings:

FIG. 2B shows a cross-section of the track of FIG. 2A, FIG. 4 is a perspective view of a longitudinal section of the back end of the track of FIGS. 2A and 2B.

In the various figures, the same references are used to designate identical or similar elements.

DETAILED DESCRIPTION THE INVENTION

For clarity, only the elements useful to understanding the described embodiments are represented and described.

The invention is of course not limited to this embodiment, which is described by of illustration, not limitation.

In the following description, when reference is made to absolute position descriptors such as the terms "front", "rear", "top", "bottom", "left", "right", etc., or relative ones such as the terms "above", "below", "upper", "lower", etc., or orientation descriptors, these refer to a seat in a normal usage position when the vehicle is traveling in the usual direction of advancement.

Figure 1:
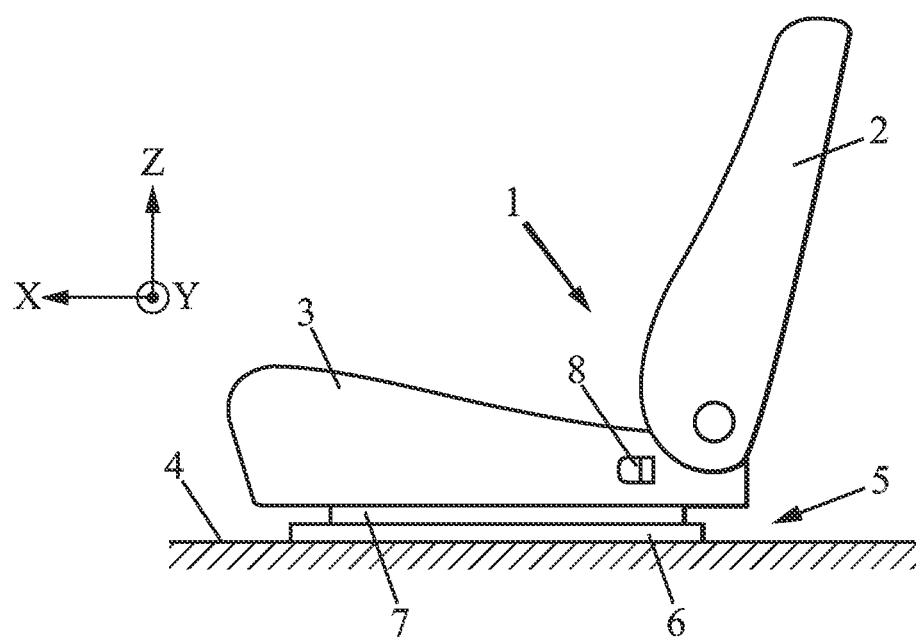
FIG. 1 is a schematic view of a vehicle seat according to an embodiment of the invention, mounted in a motor vehicle.

Thus, FIG. 1 represents a vehicle seat 1 which comprises a seat back 2 supported by a seating portion 3, the latter mounted on the floor 4 of the vehicle so as to slide in a substantially horizontal longitudinal direction X.

The seating portion 3 is connected to the floor 4 by two parallel sliding tracks 5, only one of them visible in FIG. 1.

Figure 2A:
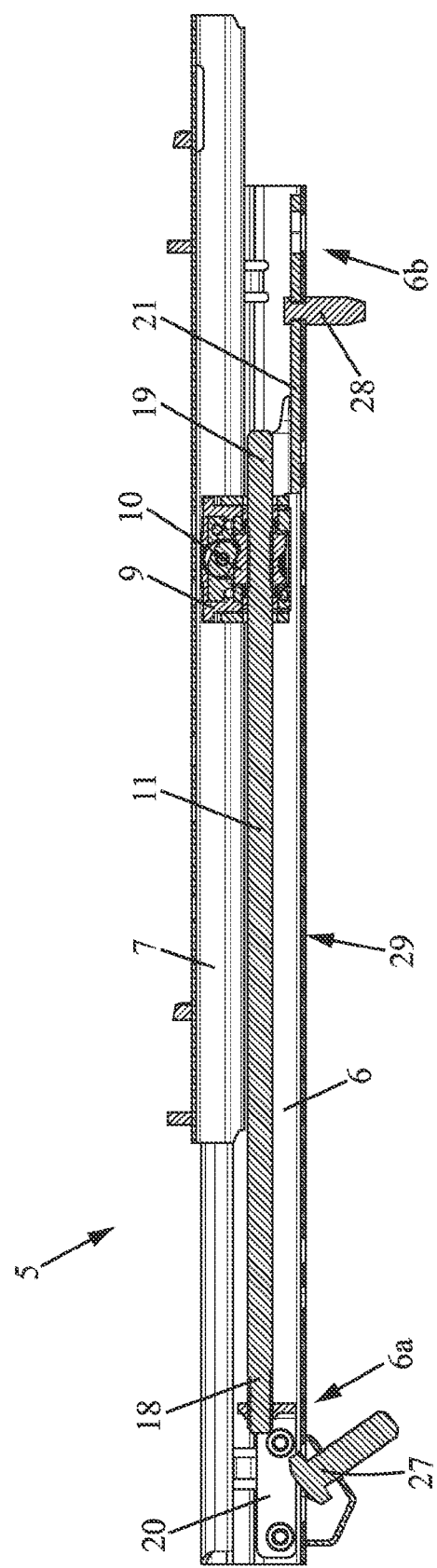
FIG. 2A shows a longitudinal section of a sliding track according to one embodiment of the invention.

As represented in FIGS. 2A and 2B, the tracks 5 comprise a first rail 6 and a second rail 7, respectively connected to the floor 4 and to the seating portion 3, which slide on one another in the longitudinal direction X.

Adjustment of the tracks 5 is preferably motorized, and controlled for example by means of a pushbutton 8 (shown in FIG. 1) which controls the operation of a drive mechanism 9 adapted to displace the second rail relative to the first rail in the longitudinal direction X.

As illustrated in FIG. 2A, the drive mechanism 9 comprises, for example, a rotating nut arrangement 10 carried by the second rail 7 of the track 5 and driven by an electric motor (not shown).

This rotating nut arrangement 10 is screwed onto a threaded rod 11 carried by the first rail 6 and extending in the longitudinal direction X.

The first 6 extends in the longitudinal direction X between a front end 6a and a back end 6b.

As can be seen in FIG. 2A, the first rail 6 can have, for example, a substantially U-shaped cross-section.

Thus, the first rail 6 comprises a base 12 extending in a horizontal plane X, Y, and more particularly extending lengthwise in the longitudinal direction X and widthwise in the transverse direction Y perpendicular to direction X.

The transverse direction Y and the longitudinal direction X may, for example, lie substantially within a horizontal plane containing the vehicle floor 4.

The base 12 of the first rail 6 may be adapted to be in contact with the motor vehicle frame as shown in FIG. 1.

More particularly, the base 12 may be adapted to be in contact with the motor vehicle frame at a bottom face 29 of the base 12, in particular between a front fastening means 27 for attaching the first rail 6 to the vehicle frame 4 and a rear fastening means 28 for attaching the first rail 6 to the vehicle frame 4, as detailed below.

The first rail 6 may further comprise two lateral flanges 13a, 13b respectively extending upward, in particular extending substantially in a first vertical plane X, Z perpendicular to the horizontal plane X, Y.

In the present description, a lateral flange of the first rail is generically designated by the numeric reference 13.

"Lateral flanges extending substantially in a vertical plane" is understood to mean that the lateral flanges 13 may not be strictly perpendicular to the horizontal plane X, Y, but in general form a non-zero angle with said horizontal plane X, Y, as illustrated for example by lateral flange 13b in FIG. 2B, for example an angle of between 45° and 135°.

The lateral flanges 13 are positioned one on either side of the base 12 in the transverse direction Y.

Each lateral flange 13 extends to an upper end which projects obliquely outward and upward with a terminating inward bend 14 to form a trough.

As can be seen in FIG. 2B, the lateral flanges 13 of the first rail 6 are positioned one on either side of the threaded rod 11 in the transverse direction Y.

This reduces the size of the rail.

As for the second rail 7, it also is substantially U-shaped with a substantially horizontal base 15 parallel to the horizontal plane X, Y, and two lateral flanges 16 extending substantially downwards, in particular substantially in the first vertical plane X, Z, and which extend obliquely outward and upward at their lower ends in flaps 17 that fit within the respective troughs 14 of the first rail 6.

Here again, "lateral flanges extending substantially in a vertical plane" is understood to mean that the lateral flanges 16 may not be strictly perpendicular to the horizontal plane X, Y, but in general form a non-zero angle with said horizontal plane X, Y.

Here again, the lateral flanges 16 of the second rail 7 are positioned one on either side of the threaded rod 11 in the transverse direction Y.

In addition, the first rail 6 and second rail 7 can be placed facing one another in the vertical direction Z, defining an inside space 32 between them.

The base 12 of the first rail 6 and the base 15 of the second rail 7 can then be placed one on either side of the threaded rod 11 in the vertical direction Z.

The inside space 32 is defined by the lateral flanges 12 of the first rail 6, the lateral flanges 16 of the second rail 7, the base 12 of the first rail 6, and the base 15 of the second rail 7.

More specifically, the first rail 6 can have an inner surface 6d and an outer surface 6c, and the second rail 7 can also have an inner surface 7d and an outer surface 7c.

The inner surface 6d of the first rail 6 and the inner surface 7d of the second rail 7 are thus facing, and delimiting, the inside space 32.

The lateral flanges 16 of the second rail 7 may in particular be surrounded by the lateral flanges 13 of the first rail 6.

The threaded rod 11 can be received within said inside space 32 defined by the first rail 6 and the second rail 7, as illustrated in FIG. 2B.

The threaded rod 11 can thus he surrounded by said inner surfaces 6d, 7d of the first rail 6 and second rail 7.

In this manner, access to the threaded rod 11 is protected by the two rails 6, 7, which reduces the possibilities for external interference with the sliding track mechanism.

Figure 3:
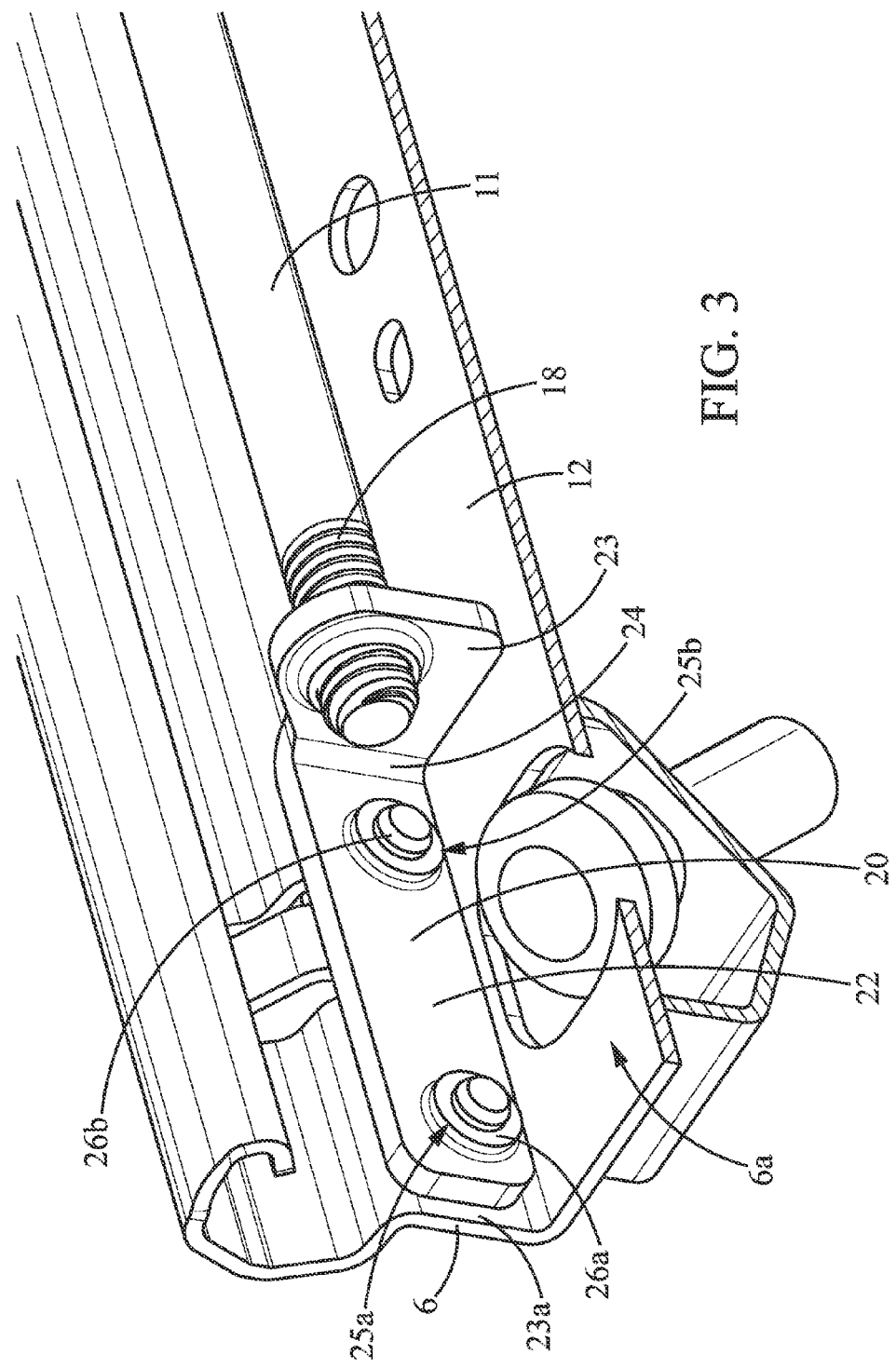
FIG. 3 is a perspective view of a longitudinal section of the front end of the track of FIGS. 2A and 2B.

Referring now to FIGS. 3 and 4 as well, the threaded rod 11 extends more specifically along the longitudinal direction X between a front end 18 and a back end 19.

In addition, the sliding track 5 comprises a front support 20 (shown in FIG. 3) and a rear support 21 (shown in FIG. 4).

The front 20 and rear 21 supports are integral with the first rail 6.

The front support 20 preferably extends from at least one lateral flange 13 of the first rail 6.

In an alternative embodiment not shown in the figures, the front support 20 can extend from both lateral flanges 13 of the first rail 6.

As can be seen in the embodiment of the figures, the front support 20 may in particular extend solely from a lateral flange of the first rail. The front support may also extend solely from both lateral flanges of the first rail.

Extending solely from a lateral flange of the first rail, or solely from both lateral flanges of the first rail, are understood to mean that the front support 20 is not mounted on or integrated with the base 12 of the first rail, or possibly is not even in contact with the base 12 of the first rail 6.

The front support 20 may extend from the inner surface 6d of the first rail 6.

In one embodiment, the front support 20 can be mounted on the lateral flange 13 of the first rail 6, for example by force or by securing elements as described below.

The front support 20 can thus be mounted in particular on the inner surface 6d of the lateral flange 13 of the first rail 6.

In this manner, the footprint and the risk of external interference with the sliding track mechanism are reduced.

Advantageously, at least one lateral flange 16 of the second rail 7 extends over only a portion of the facing lateral flange 13 of the first rail 6, leaving free space between the lower end of said lateral flange 16 of the second rail 7 and the base 12 of the first rail 6.

The front support 20 can then be mounted on the lateral flange 13 of the first rail 6 in said free space between the lower end of the lateral flange 16 of the second rail 7 and the base 12 of the first rail 6.

It is also possible for the front support 20 to be integrated into the lateral flange 13 of the first rail 6, meaning for example machined or cold formed from the material of the first rail 6.

This embodiment offers the advantage of better resistance.

The front support 20 may be formed from a block that is machined or cold formed or from a shaped plate.

Referring to FIG. 3 which illustrates an embodiment of the front support 20, this support may thus comprise:
- a substantially planar first portion 22 extending substantially in the first vertical extension plane X, Z, in particular the plane of the lateral flanges 13;
- a second portion 23 which is also substantially planar and extending substantially in a second vertical plane Y, Z, substantially perpendicular to the first vertical plane X, Z and to the horizontal plane X, Y of the base 12; and
- a bend 24 connecting the first portion 22 to the second portion 23, such that the first portion 22 is substantially perpendicular to the second portion 23.

Thus, the first portion 22 of the front support 20 more particularly can be integral with the lateral flange 13a of the first rail 6.

Furthermore, the front end 18 of the threaded rod 11 can be fixed to the second portion 23 of the front support 20.

In this manner, the front support 20 allows securing the front end of the threaded rod 11 to the first rail 6.

As illustrated in FIG. 3, the first portion 23 of the front support 20 can be secured to the lateral flange 13a of the first rail 6 in at least two securing locations 25a, 25b, referred to generically in the present description by the numeral 25.

The first portion 23 of the front support 20 may, for example, be secured to the lateral flange 13a by means of at least two securing elements 26a, 26b respectively placed at said respective securing locations 25a, 25b. The securing elements 26a, 26b are, for example, nuts, rivets, spot welds, or any other fixed securing means that is known.

The securing locations 25a, 25b may advantageously be spaced apart from one another along the longitudinal direction X. This ensures that the front end 18 of the threaded rod 11 is securely retained.

In addition, as illustrated in FIGS. 2 and 3, the track 5 may further comprise a front fastening means 27 for attaching the first rail 6 to the frame 4 of the motor vehicle.

The front fastening means 27 is mounted on the base 12 of the first rail 6. In particular, the front fastening means 27 is integral with e front end 6a of the first rail 6.

The front support 20 can then advantageously be mounted on lateral flange 13a of the first rail 6 so as to be arranged substantially facing the front fastening means 27 in the transverse direction Y.

"The front support is arranged substantially facing the front fastening means in the transverse direction" is understood to mean that the front support and the front fastening means are arranged substantially at the same location relative to the longitudinal extension of the first rail 6. The front support and front fastening means are thus at least partially side by side in a transverse plane Y, Z of the first rail 6, arranged respectively on the base 12 and on a lateral flange 13a of the first rail 6. This means in particular that the front support and the front fastening means are not placed one behind the other along the longitudinal extension of the first rail 6.

Referring now to FIG. 4, the rear support 21 is integral with the base 12 of the first rail 6. The rear support 21 receives the back end 19 of the threaded rod 11.

More particularly, in the example of FIG. 4, the rear support 21 comprises a base 30 extending substantially in the horizontal plane X, Y of the base 12 of the first rail 6. Base 30 is in planar contact with the base 12 of the first rail 6 and is integral with said base 12.

The rear support 21 also comprises two substantially vertical flanges 31 between which the back end 19 of the threaded rod 11 is fixedly secured by compression between the flanges 31.

Moreover, as illustrated in FIGS. 2 and 4, the track 5 may further comprise a rear fastening means 28 for attaching the first rail 6 to the frame 4 of the motor vehicle.

The rear fastening means 28 is mounted on the base 12 of the first rail 6. In particular, the rear fastening means 28 is integral with the back end 6b of the first rail 6.

The rear support 21 can then advantageously be mounted on the base 12 of the first rail 6 by the rear fastening means 28, as illustrated in FIG. 4 where the rear fastening means 28 is a bolt passing through the rear support 21 and the base 12 of the first rail and received in a housing in the floor 4 of the motor vehicle.

In this manner, the track 5 does not have portions that protrude beyond the bottom face 29 of the base 12 of the first rail 6 between the front fastening means 27 and the rear fastening means 28.

The invention claimed is:
1. A sliding track for a vehicle seat, comprising:
a first rail adapted to be secured to a motor vehicle frame, the first rail extending in a longitudinal direction and comprising:
a base extending along a horizontal plane, and
two lateral flanges arranged one on either side of the base relative to a transversal direction in the horizontal plane perpendicular to the longitudinal direction,
a second rail mounted so as to slide relative to the first rail in the longitudinal direction,
a drive mechanism adapted to move the second rail relative to the first rail in the longitudinal direction,
wherein the drive mechanism comprises a threaded rod extending in the longitudinal direction between a front end and a back end, the sliding track comprising a front support integral with the first rail and to which the front end of the threaded rod is attached,
wherein the front support extends from at least one lateral flange of the first rail,
wherein the sliding track further comprises a front fastening means for attaching the first rail to a motor vehicle frame, mounted on the base of the first rail,
and wherein the front support is mounted on a lateral flange of the first rail, such that the front support is arranged substantially facing the front fastening means, in the transverse direction.
2. The sliding track according to claim 1, wherein the front support is mounted on, or integrated with, said at least one lateral flange.

3. The sliding track according to claim 1, wherein the front support has a substantially planar first portion, a substantially planar second portion, and a bend connecting the first portion to the second portion such that the first portion is substantially perpendicular to the second portion.

4. The sliding track according to claim 3, wherein the first portion of the front support is integral with a lateral flange of the first rail and wherein the front end of the threaded rod is fixed to the second portion of the front support.

5. The sliding track according to claim 4, wherein the first portion of the front support is secured to said lateral flange of the first rail in at least two securing locations spaced apart from each other along the longitudinal direction, wherein the first portion of the front support is secured by at least two securing elements respectively arranged at said securing locations.

6. The sliding track according to claim 1, further comprising a rear support integral with the base of the first rail and receiving the back end of the threaded rod.

7. The sliding track according to claim 1, wherein the front end of the threaded rod is screwed to the front support and wherein the back end of the threaded rod is secured in a fixed manner to the rear support, in particular by compression between two flanges of said rear support.

8. The sliding track according to claim 1, wherein the front support extends from an inner surface of the first rail.

9. The sliding track according to claim 1, wherein the threaded rod is received within an inner space inside the sliding track, delimited by the first rail and second rail.

10. The sliding track according to claim 1, wherein the sliding track is adapted to be in contact with the motor vehicle frame at a bottom face of the base of the first rail, between the front fastening means and a rear fastening means for attaching the first rail to a motor vehicle frame,
and wherein the sliding track has no parts protruding below said bottom face, between said front fastening means and said rear fastening means.

11. The sliding track according to claim 10, wherein the first and second fastening means each comprise a bolt that secures the first rail to the motor vehicle frame.

12. A vehicle seat comprising a seating portion supported by at least one sliding track according to claim 1.

* * * * *